(12) United States Patent
Dagand et al.

(10) Patent No.: US 10,830,264 B2
(45) Date of Patent: Nov. 10, 2020

(54) ARRANGEMENT FOR FASTENING A PANEL IN A SLOT USING TWO OPPOSITE WEDGES

(71) Applicant: SB INGENIERIE SAS, Poisy (FR)

(72) Inventors: Cyril Dagand, Rumilly (FR); Wilfried Borrod, Nonglard (FR)

(73) Assignee: SB INGENIERIE SAS, Poisy (FR)

( * ) Notice: Subject to any disclaimer, the term of this patent is extended or adjusted under 35 U.S.C. 154(b) by 411 days.

(21) Appl. No.: 15/815,566

(22) Filed: Nov. 16, 2017

(65) Prior Publication Data

US 2018/0135669 A1 May 17, 2018

(30) Foreign Application Priority Data

Nov. 17, 2016 (FR) ...................... 16 61143

(51) Int. Cl.
*F16B 2/14* (2006.01)
*E04F 11/18* (2006.01)

(52) U.S. Cl.
CPC ............ *F16B 2/14* (2013.01); *E04F 11/1853* (2013.01); *E04F 2011/1823* (2013.01); *E04F 2011/1895* (2013.01)

(58) Field of Classification Search
CPC ......... F16B 2/14; F16B 9/023; E04F 11/1812; E04F 11/1853; E04F 2011/1823; E04F 2011/1825; E04F 2011/1829; E04F 2011/1895; E06B 3/5454; E06B 3/5864; Y10T 403/7064; Y10T 403/7066; Y10T 403/7067
USPC ................... 403/374.1, 374.2, 374.3
See application file for complete search history.

(56) References Cited

U.S. PATENT DOCUMENTS

| 9,366,382 | B2 * | 6/2016 | Bonomi .............. E04F 11/1853 |
| 9,657,760 | B2 * | 5/2017 | Giacometti .............. F16B 2/14 |
| 9,816,276 | B2 * | 11/2017 | Noble .................. E04F 11/1812 |
| 10,640,985 | B2 | 5/2020 | Strehlow et al. |

(Continued)

FOREIGN PATENT DOCUMENTS

| DE | 102006028766 A1 | 12/2007 |
| EP | 2921607 A2 | 9/2015 |
| WO | 2018/01130 A1 | 1/2018 |

OTHER PUBLICATIONS

Rapport de Recherche Preliminaire, dated Jul. 4, 2017, issued in corresponding French Application No. 1661143, filed Nov. 17, 2016, 2 pages.

(Continued)

*Primary Examiner* — Josh Skroupa
(74) *Attorney, Agent, or Firm* — Christensen O'Connor Johnson Kindness PLLC

(57) ABSTRACT

An arrangement for fastening a vertical panel in a longitudinal receiving slot by transverse gripping between two wedges includes a first wedge inserted between a vertical face of the slot and a first face of the panel; a second opposite wedge inserted between a vertical face opposite the slot and a face opposite the panel; a screw-nut assembly intended to produce a vertical translational force from the second wedge in a gripping direction; wherein the screw-nut assembly is arranged on the same side of the panel as the first wedge, the translational force being transmitted to the second wedge via a movable transmission member.

7 Claims, 3 Drawing Sheets

(56) References Cited

U.S. PATENT DOCUMENTS

2015/0240851 A1 8/2015 Giacometti et al.
2017/0101784 A1* 4/2017 Gonzato ............ E04F 11/1812

OTHER PUBLICATIONS

Opinion É crite sur la Bervetabilité de l'Invention, issued in corresponding French Application No. 1661143, filed Nov. 17, 2016, 4 pages.

* cited by examiner

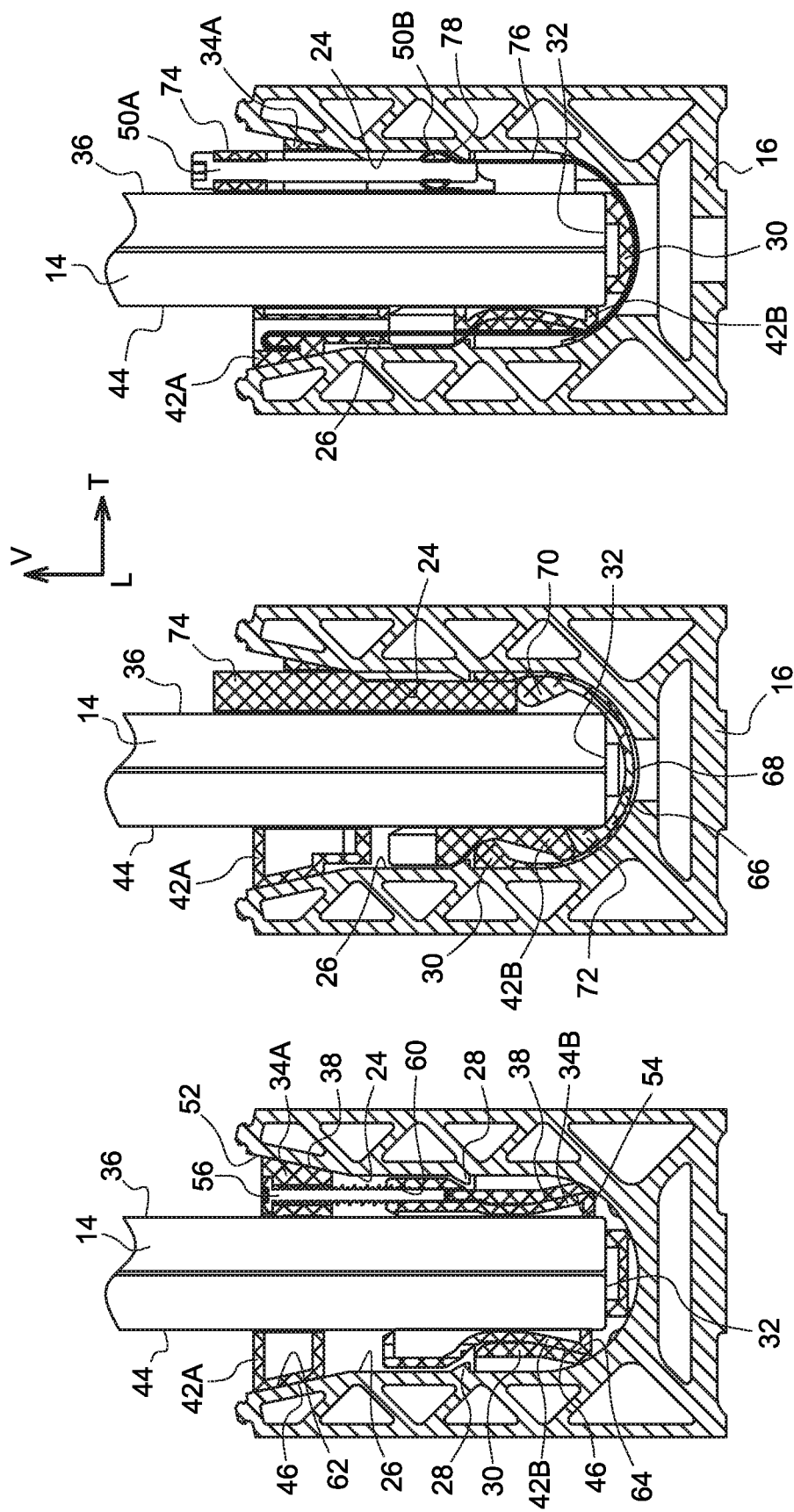

ARRANGEMENT FOR FASTENING A PANEL IN A SLOT USING TWO OPPOSITE WEDGES

TECHNICAL FIELD

Embodiments of the present disclosure relate to an arrangement for fastening a vertical panel in a longitudinal receiving slot by transverse gripping between at least two transversely opposite wedges. Examples of the arrangement include, for example, at least one first wedge that is inserted between a first vertical face of the slot and a first face of the panel and at least one opposite second wedge mounted across from the first wedge on the other side of the panel. In some examples, the second wedge is inserted between a second vertical face opposite the slot and a second vertical face opposite the panel and cooperates by vertical sliding with a second fixed ramp to adjust the verticality of the panel. Examples of the arrangement also include at least one screw-nut assembly configured to produce a vertical translational force from the second wedge in a gripping direction between the panel and the second face of the slot.

BACKGROUND

It is known to produce railings by fastening a vertical panel in the slot of a rail. Such a panel is, for example, made from glass.

Traditionally, the positioning and fastening of a railing panel in the slot is done by inserting at least two opposite wedges on either side of the panel. To be able to adjust the verticality of the panel at the same time as its fastening, the gripping of each wedge is adjusted using an associated screw-nut assembly. The wedge is thus gripped either by moving the screw, or by moving the nut during screwing of the screw.

Each screw-nut assembly is arranged on the same side of the panel as the wedge whose gripping controls. Thus, when mounting the railing, an operator first installs the panel in the slot. The operator next accesses a first side of the panel to adjust the gripping of the first wedge. Then the operator accesses the other side of the panel to adjust the gripping of the second opposite wedge.

An example of such an arrangement for fastening a panel is for example disclosed in document EP-A2-2,921,607. Such an arrangement allows very strong fastening of the panel in the slot allowing easy adjustment of the verticality of the panel.

However, in some cases, the panel is only easily accessible from one side. This is in particular the case when the railing is arranged at a height. This makes it impossible to correctly screw the wedge situated on the other, inaccessible side without using lifting means, such as an aerial device or a scaffolding.

To resolve this problem, fastening arrangements have already been proposed including wedges only on the accessible side. However, such an arrangement does not allow effective fastening of the panel in the rail. Furthermore, such an arrangement does not allow easy adjustment of the verticality of the panel during the fastening operation.

SUMMARY

Embodiments of the present disclosure aim to address the shortcomings of the prior art by proposing a railing fastening arrangement of the type previously described, characterized in that the screw-nut assembly is arranged on the same side of the panel as the first wedge, the translational force being transmitted to the second wedge via a movable transmission member that is interposed between a lower edge of the panel and the bottom of the slot.

Such a fastening arrangement makes it possible to retain the advantages of a fastening arrangement with two opposite wedges while allowing fastening from a single side of the panel.

Embodiments of the arrangement may include any one of the following optional features, or combinations thereof:
- the transmission member is a rigid part mounted rotating around a longitudinal axis between the bottom of the slot and the lower edge of the panel;
- the transmission member is a flexible member that works by traction around a fixed angular member support that bypasses the lower edge of the panel;
- the fixed angular member support is made in a cradle that straddles the lower edge of the panel and that is inserted between the panel and the bottom of the slot;
- the gripping direction of the second wedge is oriented toward the bottom of the slot, the transmission member working by traction during gripping of the wedge.
- the vertical translation force is produced by moving the nut vertically toward an upper opening of the slot, a first end of the transmission member being secured in movement with the nut and a second end of the transmission member being secured in movement with the second wedge;
- the gripping direction of at least one second opposite wedge is oriented toward an upper opening of the slot, the transmission member working by compression during the gripping of the wedge;
- the transmission member slides along an arc of circle trajectory parallel to the bottom of the slot;
- the vertical translation force is produced by the movement of the screw toward the bottom of the slot, a first end of the transmission member being stressed bearing by the screw and a second end of the transmission member stressing the wedge by bearing;
- the arrangement includes two opposite wedges that have opposite vertical gripping directions, the sliding of each second wedge being controlled respectively by the nut and the screw of the same screw-nut assembly.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 3 is a sectional view along a vertical transverse cutting plane passing through a gripping screw that shows the fastening device of FIG. 2 positioned in a rail, the gripping screw commanding the gripping of the first two wedges;

FIG. 4 is a sectional view along a cutting plane parallel to that of FIG. 3 and passing through a first transmission member in compression that shows the transmission chain of the vertical translational force from a screw to a second lower wedge on the side opposite the screw relative to the panel;

FIG. 5 is a sectional view along a cutting plane parallel to that of FIG. 3 and passing through a second transmission member in traction that shows the transmission chain of the vertical translational force from a nut to a second upper wedge on the side opposite the nut relative to the panel.

DETAILED DESCRIPTION

The detailed description set forth below in connection with the appended drawing, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the rest of the description, we will non-limiting the adopt longitudinal, vertical and transverse orientations indicated by the trihedron "L, V, T" in the FIGURES.

Figure 1:
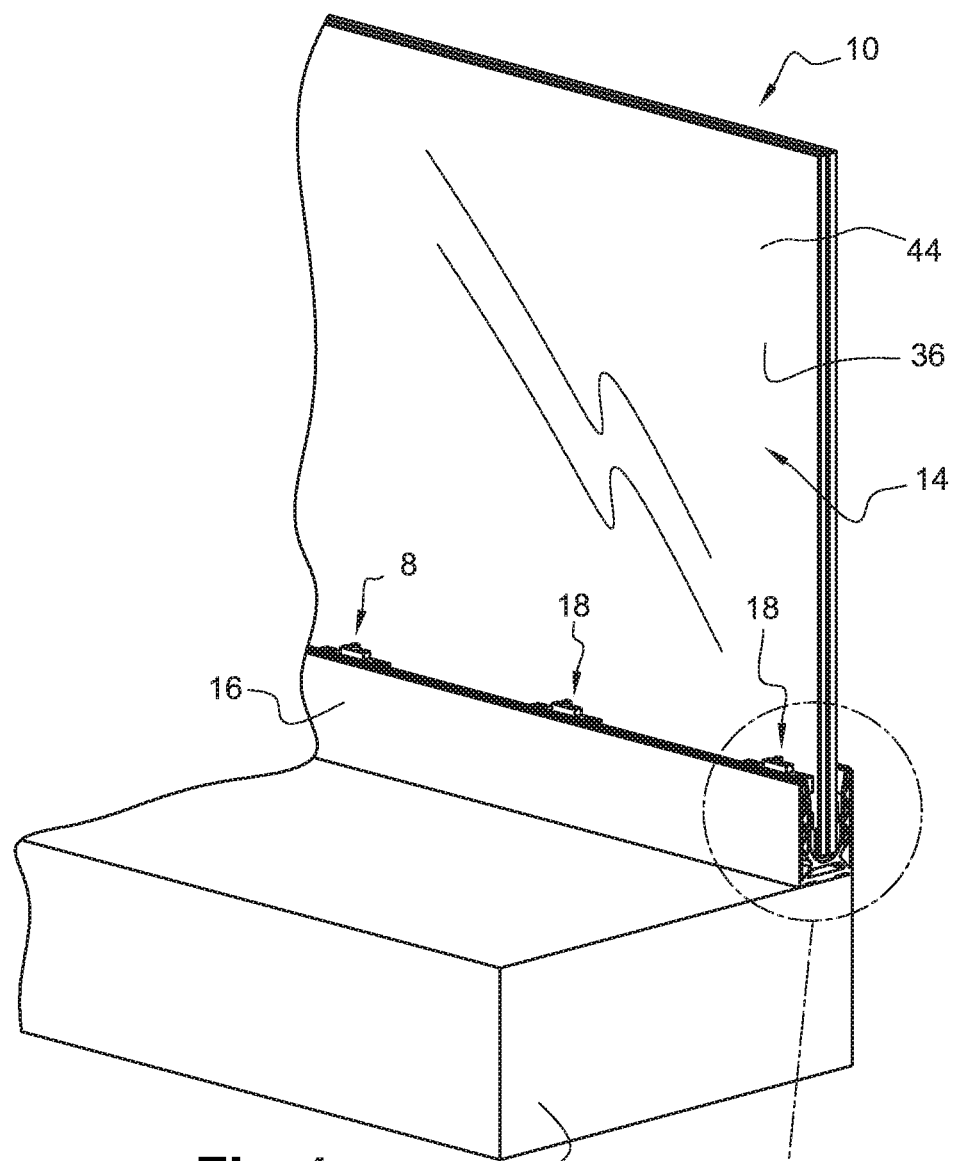
FIG. 1 is a perspective view that shows a vertical panel fastened in a rail using fastening devices made according to one or more aspects of the present disclosure.

FIG. 1 shows a railing 10 that is mounted on the border of a slab 12, for example a concrete slab. The border of the slab 12 is difficult to access here; it is for example arranged at a height.

Figure 1A:
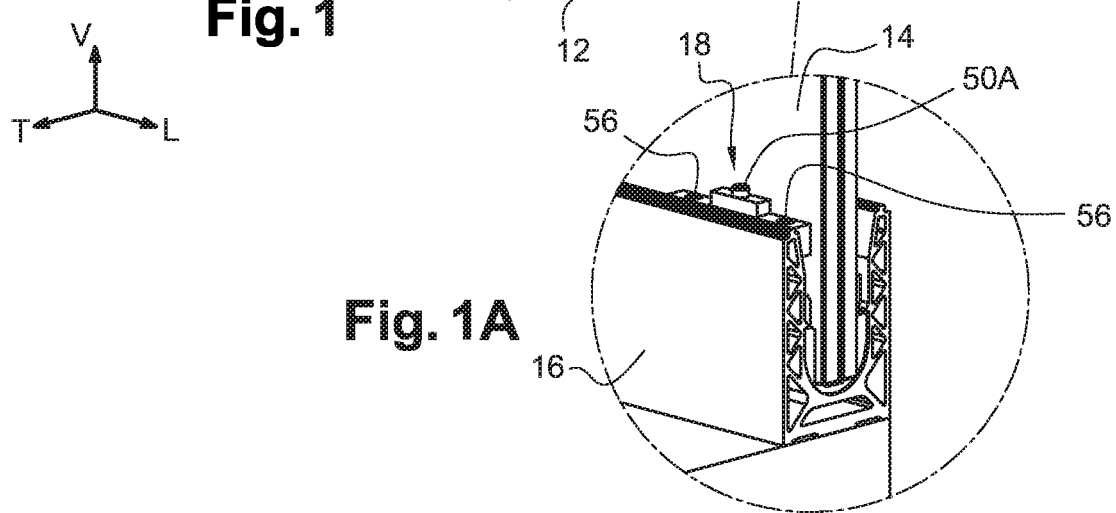
FIG. 1A is an enlarged view of the fastening device of FIG. 1.

As shown in FIGS. 1 and 1A, the railing 10 includes a vertical panel 14 and a support rail 16. The panel 14 in some embodiments is made from or includes glass. The panel 14 is maintained vertically in the support rail 16 by several fastening devices 18. Each fastening device 18 is configured to make it possible to fasten the panel 14 firmly in a vertical position and to withstand very substantial loads.

Figure 2:
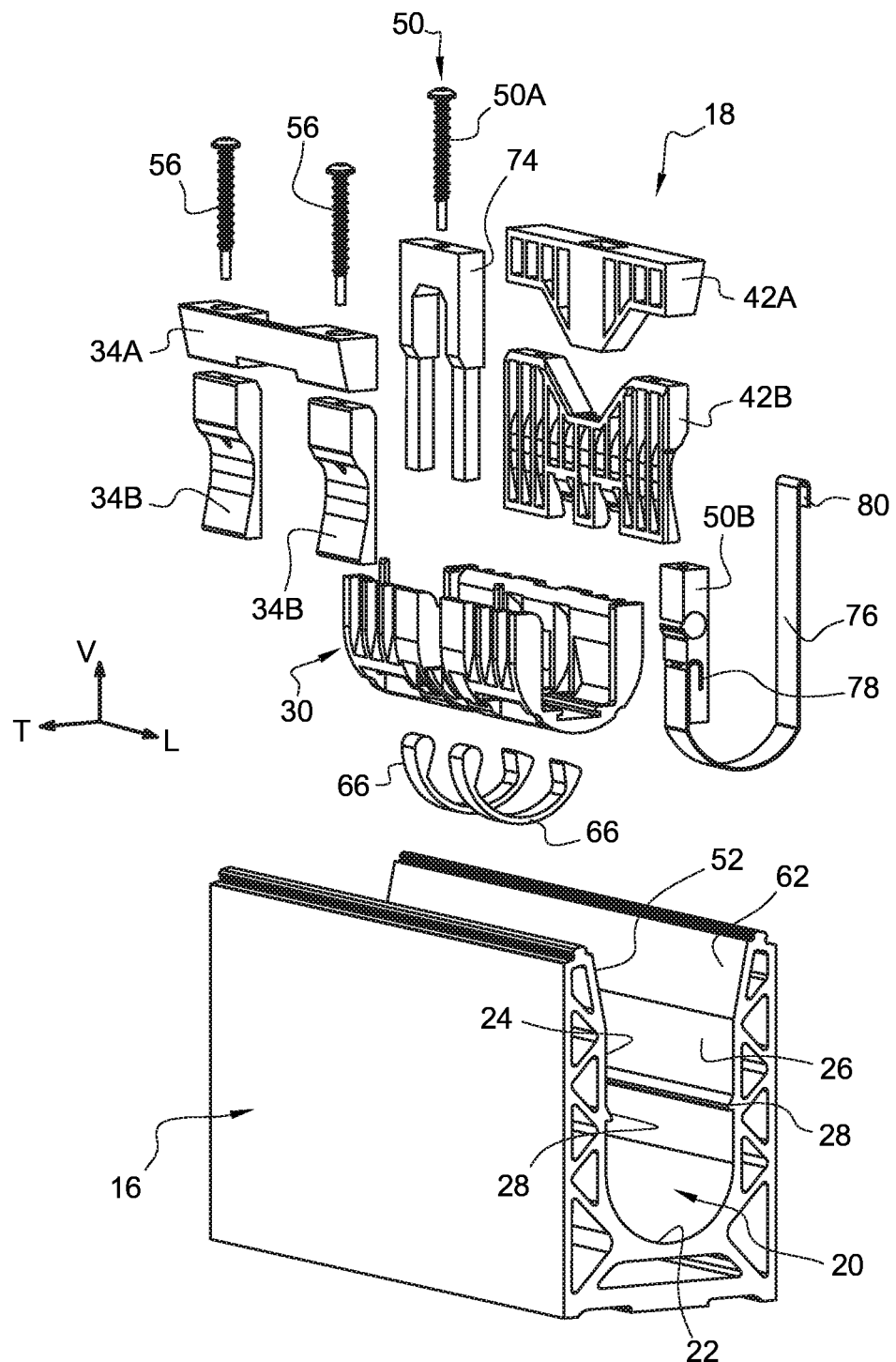
FIG. 2 is an exploded perspective view showing the fastening device of FIG. 1.

As illustrated in more detail in FIG. 2, the support rail 16 is for example formed by an aluminum profile, shown for instance having a U-shaped section inwardly defining a slot 20 for receiving the panel 14 and the fastening device 18. The support rail 16 extends continuously in the longitudinal direction. The support rail 16 is intended to be fastened to the slab 12.

The slot 20 has a concave curved bottom 22, semicircular in some embodiments, extended by two opposite vertical faces 24, 26 arranged transversely across from one another. The slot 20 has an upper opening. The width of the slot 20 between the two side faces 24, 26 is larger than the thickness of the panel 14. The first vertical face 24 is situated on the accessible side of the rail, while the second vertical face 26 is situated on the inaccessible side of the rail.

Each fastening device 18 is designed as a module made up of several parts, some of which can be preassembled before being inserted in the slot 20. We will now describe a fastening device 18 in more detail with in reference to FIGS. 2 to 5. The fastening device 18 includes at least two opposite wedges 34A, 34B; 42A, 42B that are configured to grip the vertical panel 14 transversely in the longitudinal receiving slot 20.

The fastening device 18 also includes a cradle 30 that is designed to straddle a lower edge 32 of the panel 14, as shown in FIG. 3. The cradle 30 has a rounded lower face with a shape complementary to that of the bottom 22 of the receiving slot 20. The cradle 30 is received in the slot 20 with sufficient transverse clearance to allow angular travel of the panel 14 around a longitudinal axis by sliding of the lower face of the cradle 30 against the bottom 22. This makes it possible to adjust the verticality of the panel 14 based on the horizontality of the slab 12.

Each vertical face 24, 26 of the slot further includes a protruding stop 28 that is configured to retain the cradle 30 vertically at the bottom of the slot 20. In some embodiments, the cradle 30 is made from or includes rigid plastic.

The fastening device 18 includes at least one first wedge 34A or 34B that is inserted between the first vertical face 24 of the slot 20 and a first face 36 of the panel 14, as illustrated in FIG. 3. The first face 36 of the panel 14 is turned toward the accessible side of the slab 12. The first wedge 34A or 34B has at least one inclined face 38 that is configured to cooperate with a fixed ramp to allow it to be gripped by vertical sliding. The ramp is secured either to the support rail 16, or to the cradle 30.

The fastening device 18 includes at least one opposite second wedge 42A or 42B mounted across from the first wedge 34A, 34B of the other side of the panel 14. The second wedge 42A or 42B is inserted between the second opposite vertical face 26 of the slot 20 and a second opposite face 44 of the panel 14. The second face 36 of the panel 14 is turned toward the inaccessible side of the slab 12. The second wedge 42A or 42B has at least one inclined face 46 that is configured to cooperate by gliding with a fixed ramp to allow it to be gripped by vertical sliding. The ramp is secured either to the support rail 16, or to the cradle 30.

The vertical sliding of each first wedge 34A, 34B and second wedge 42A, 42B thus makes it possible to adjust the verticality of the panel 14 at the same time as to fix it in vertical position by transverse gripping between the wedges 34A, 34B; 42A, 42B.

At least the second wedge 42A, 42B is commanded in sliding by a screw-nut assembly 50 that is configured to produce a vertical translational force of the second wedge 42A, 42B in a gripping direction between the panel 14 and the second face 26 of the slot 20. Each wedge 34A, 34B, 42A, 42B slides along a very short travel of about several millimeters.

However, the adjustment of the screw-nut assembly 50 can only be done after inserting the panel 14 into the slot 20. The second wedge 42A, 42B is then situated on the inaccessible side of the panel 14. In the state of the art, the screw-nut assembly is arranged on the inaccessible side of the panel. The gripping of the second wedge could only be done by using access means such as a scaffolding or platform.

Embodiments of the present disclosure propose an arrangement for fastening the panel 14 in the support rail 16 making it possible to adjust the gripping of the second wedge 42A, 42B from the accessible side of the panel 14. Embodiments of the disclosure thus propose to arrange the screw-nut assembly 50 on the same side of the panel 14 as the first wedge 32A, 32B. The translational force produced by the screw-nut assembly 50 is then transmitted to the second wedge 42A, 42B via a transmission member that is interposed between a lower edge of the panel 14 and the bottom 22 of the slot 20.

In the embodiments shown in the FIGURES, the fastening device 18 includes several first wedges 34A, 34B. It thus includes, non-limitingly, a first upper wedge 34A and two first lower wedges 34B. The upper wedge 34A cooperates with a ramp 52 that is formed in the upper part of the first face 24 of the slot 20. The ramp 52 is configured so that the gripping of the wedge 34A between the panel 14 and the first face 24 of the slot 20 occurs during its downward sliding.

The lower wedges 34B each cooperate with a ramp 54 associated with the cradle 30 that bears transversely against the first face 24 of the slot 20. The lower wedges 34B are more particularly interposed between the ramp 54 and the panel 14. The ramp 54 is configured so that the gripping of the wedge 34B between the panel 14 and the first face 24 of the slot 20 occurs during its upward sliding.

The sliding of the upper wedge 34A and that of each lower wedge 34B is done using two vertical screws 56. Each screw 56 is received in an associated smooth orifice 58 pierced in the upper wedge 34A aligned with each lower wedge 34B. The lower end of each screw 56 is screwed into an orifice 60 of each lower wedge 34B. The screw 50A is for example forcibly screwed in the orifice 60. Alternatively, the orifice 60 is tapped. In any case, the screw 50A is engaged with the associated lower wedge 34B.

Thus, when the screws 56 are screwed, the lower wedges 34B, blocked in rotation, slide upward until they are jammed between the ramp 54 and the panel 14. By continuing the screwing, the head of the screw bears on the upper wedge 34A to cause it to slide downward until it is jammed between the first face 24 of the slot 20 and the panel 14. The screwing can be continued until the wedges 34A, 34B are gripped with the desired vertical force to obtain the vertical fastening of the panel 14. Aside from the fastening speed, this system for adjusting the position of the wedge 34A and each wedge 34B with a same screw 56 makes it possible to balance the tightening force applied by each wedge 34A, 34B against the panel 14.

The fastening device 18 also includes two second wedges 42A, 42B. It thus includes a second upper wedge 42A and a second lower wedge 42B. These second wedges 42A, 42B are arranged across from the first wedges 34A, 34B to allow gripping of the panel 14 over the entire height of the panel portion 14 inserted into the slot 20. The fastening of the panel 14 in the support rail 16 is thus very solid and the fastening of the panel 14 can withstand even a very substantial transverse force applied to its upper edge.

The second wedge 42A cooperates with a ramp 62 that is formed in the upper part of the second face 26 of the slot 20. The ramp 62 is configured so that the gripping of the second upper wedge 42A between the panel 14 and the second face 26 of the slot 20 occurs during its downward sliding.

The lower wedge 42B cooperates with an associated ramp 64 of the cradle 30 that bears transversely against the second face 26 of the slot 20. The second lower wedge 42B is more particularly interposed between the ramp 64 and the panel 14. The ramp 64 is configured so that the gripping of the second lower wedge 42B between the panel 14 and the second face 26 of the slot 20 occurs during its upward sliding.

The screw-nut assembly 50 here simultaneously commands the sliding of the two second wedges 42A, 42B. It includes a vertical screw 50A and a nut 50B. The screw head is oriented upward. The screw-nut assembly 50 is interposed between the first face 36 of the panel and the first face 24 of the slot 20.

The sliding of the second lower wedge 42B here is commanded by the vertical movement of the screw 50A during screwing thereof. The vertical movement of the screw 50A produces a vertical translation force that is oriented downward. This vertical translation force is transmitted to the second lower wedge 42B with a change of direction so as to become a vertical translation force oriented upward in order to slide the second lower wedge 42B toward the upper opening of the slot 20.

The transmission of the vertical translational force is done using at least one first transmission member 66. In the embodiment shown in FIG. 2, the fastening device 18 includes two first transmission members 66 that work in parallel. As shown in FIG. 4, each transmission member 66 is, for example, a rigid part mounted rotating around a longitudinal axis between the bottom 22 of the slot 20 and the lower edge 32 of the panel 14. To that end, each transmission member 66 has a lower guide face 68 in the form of an arc of circle complementary to the curve of the bottom 22 of the slot 20. The rotation axis is thus vertically off-centered toward the panel, the transmission member 66 sliding in one unit along an arc of circle-shaped trajectory.

The transmission member 66 assumes the form of a curved segment that is arranged in a guide channel formed in the cradle 30. The lower face 68 of the transmission member 66 bears against a lower partition of the cradle 30 that is inserted between the transmission member 66 and the bottom 22 of the slot 20. This lower partition has an arc of circle shape complementary to the bottom 22 of the slot 20. This arrangement makes it possible to prevent the transmission member 66 from being pressed directly against the bottom 22 of the slot 20, which would cause lifting of the cradle 30 during gripping of the corresponding wedge 42B. On the contrary, by bearing on a lower partition of the cradle 30, the cradle 30 remains against the bottom 22 of the slot 20 irrespective of the gripping state of the corresponding wedge 42B.

The transmission member 66 has a first end 70 that is arranged on the accessible side of the panel 14 and that is intended to be stressed by the screw 50A. It also includes a second end 72 that is intended to stress the second lower wedge 42B.

To be able to push the lower wedge 42B toward its gripping position, e.g., upward, the transmission member 66 works by compression during gripping of the wedge 42B.

In the embodiments shown in the FIGURES, the transmission members 66 are stressed via a staple 74 mounted sliding vertically in the slot 20 on the accessible side of the panel 14. The staple includes an upper crosspiece that is equipped with a smooth orifice configured to receive the threaded shank of the screw 50A. The head of the screw 50A rests on an upper face of the crosspiece. The staple 74 includes two parallel tabs that extend vertically downward to a lower end stressing first ends 70 of the transmission members 66 in favor of guide channels reserved in the cradle 30.

The first lower wedges 34A are arranged longitudinally on either side of the staple 74. A vertical passage is reserved in the first upper wedge 34A to guide the vertical sliding of the staple 74.

In an embodiment that is not shown, at least a first transmission member 66 is stressed directly by the lower end of the screw 50A. According to another embodiment that is not shown, the first transmission member is a lever that bears against a fixed point, for example made in the bottom of the cradle. The lever thus pivots around a longitudinal axis situated below the lower edge of the panel.

The sliding of the second upper wedge 42A is commanded by the vertical movement of the nut 50B during screwing of the screw 50A. The vertical movement of the nut 50B produces a vertical translation force that is oriented upward. This vertical translation force is transmitted to the second upper wedge 42A with a change of direction so as to become a vertical translation force oriented downward in order to slide the second upper wedge 42A toward the bottom of the slot 20.

The transmission of the vertical translational force is done using at least one second transmission member 76. In the embodiment shown in FIG. 2, the fastening device 18 includes a single second transmission member 76. The second transmission member 76 is a flexible member that works by traction around a fixed angular member support that bypasses the lower edge 32 of the panel 14 via the bottom.

The fixed angular member support is formed by the lower face of the cradle 30. If needed, a sleeve (not shown) of resistant and/or slippery material can be inserted between the second transmission member 76 and the lower face of the cradle 30. The lower face of the cradle 30 has an arc of circle shape. Thus, the segment of the second transmission member 76 that is situated against the fixed angular member support slides along an arc of circle trajectory, while the two end strands of the transmission member 76 slide vertically.

The second transmission member 76 is formed by a flexible strip, for example, a metal spring leaf or a composite leaf. The leaf is arranged flat against the lower face of the cradle 30. In an alternative that is not shown, the leaf forming the second transmission member is wide enough to envelop the first transmission members. Thus, the first transmission members slide against an upper face of the leaf forming the second transmission member instead of sliding against a lower wall of the cradle.

According to another embodiment that is not shown, the second transmission member is formed by a cable. According to still another embodiment that is not shown, the transmission member is formed by a chain of articulated elements.

A first end 78 of the second transmission member 76 is arranged on the accessible side of the panel 14. This first end 78 is secured to the nut 50B in vertical sliding. In the example shown in the FIGURES, the first end 78 is curved in the form of a hook to be attached to the nut 50B.

A second end 80 of the second transmission member 76 is arranged on the inaccessible side of the panel 14. This second end 80 is secured to the second upper wedge 42A. In the example shown in the FIGURES, the first end 80 is curved in the form of a hook to be attached to the second upper wedge 42A.

It will of course be understood that the ends of the second transmission member 76 can be fastened by means other than attaching, such as welding, gluing, overmolding, jamming additional forms, etc.

The nut 50B is of course designed to be immobilized in rotation relative to the rail 16. In some embodiments, the nut 50B is housed between the tabs of the staple 74 so as to allow it to slide vertically along the screw 50A during screwing/unscrewing thereof.

When the panel 14 is mounted in the rail 16, the fastening device 18 is preassembled. Thus, the wedges 34B, 42A, 42B are positioned in the cradle 30, with the exception of the first upper wedge 34A. The screw-nut assembly 50 is also assembled, as well as the transmission members 66, 76. The module thus preassembled is inserted into the slot 20 of the rail 16. The panel 14 is next received in the cradle 30 between the wedges 34B, 42A, 42B. Thus, all of the elements situated on the inaccessible side of the panel 14 are positioned before placement of the panel 14. The first upper wedge 34A is next positioned with the gripping screws 56.

During gripping of the second wedges 42A, 42B, the screw 50A is screwed into the nut 50B. This operation causes the mutual movement of the screw 50A downward and the nut 50B upward.

The head of the screw 50A next bears on the staple 74, which stresses the first transmission members 66 downward, via its tabs. The guide face 68 of each first transmission member 66 slides against the lower partition of the cradle 30 such that the second end 72 upwardly stresses the second lower wedge 42B in its gripping position. Thus, the vertical translation force is produced by the downward movement of the screw 50A, a first end 70 of the transmission member 66 being stressed bearing by the screw 50A, here via the staple 74, and a second end 72 of the transmission member 66 stressing the wedge 42B by bearing.

At the same time, the nut 50B moves vertically upward while pulling on the second transmission member 76. This second transmission member 76, bearing on the lower face of the cradle 30, pulls the second upper wedge 42A downward to its gripping position. Thus, the vertical translation force is produced by moving the nut 50B vertically upward, a first end 78 of the transmission member being secured in movement with the nut 50B and a second end 80 of the transmission member being secured in movement with the second upper wedge 42A.

The command of the gripping of the second wedges 42A, 42B by a shared screw-nut assembly 50 makes it possible to adjust the gripping of the wedges 42A, 42B quickly through a single screwing operation. Furthermore, this guarantees that the gripping force of the wedges 42A, 42B is balanced.

Thus, the second wedges 42A, 42B arranged on the inaccessible side of the panel 14 are gripped using the screw 50A, which is arranged on the accessible side of the panel 14. More particularly, the screw 50A is arranged near the gripping screws 56 of the first wedges 34A, 34B. Thus, an operator can quickly adjust the verticality and fastening of the panel 14 without having to move. The screw heads 50A, 56 are accessible through the upper opening of the slot 20 on the same side of the panel 14.

In an embodiment that is not shown, the fastening device 18 includes a single second wedge 42A or 42B that can be gripped either by downward sliding, or by upward sliding. Such an embodiment is particularly applicable when each fastening device includes only two opposite wedges each arranged on one side of the panel.

Embodiments of the disclosure have been described as they apply to the fastening of a railing panel in a rail. It will be understood that it is applicable to any other type of device comprising a panel having to be fastened in a rail, for example a glass partition for a counter, a signpost, etc.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An arrangement for fastening a vertical panel in a longitudinal receiving slot by transverse gripping between at least two transversely opposite wedges, the arrangement comprising:
   a first wedge insertable between a first vertical face of the slot and a first face of the panel;
   an opposite second wedge mountable across from the first wedge on the other side of the panel, the second wedge insertable between a second vertical face of the slot and a second face of the panel, the second wedge cooperating by vertical sliding with a fixed ramp for adjusting the verticality of the panel;

a screw-nut assembly configured to produce a vertical translational force from the second wedge in a gripping direction between the panel and the second vertical face of the slot;

wherein the screw-nut assembly is arrangeable on the same side of the panel as the first wedge, the translational force being transmitted to the second wedge via a movable transmission member that is interposable between a lower edge of the panel and the bottom of the slot, wherein the movable transmission member is a rigid part mountable for rotation around a longitudinal axis between the bottom of the slot and the lower edge of the panel.

2. The arrangement according to claim 1, wherein the gripping direction of the second opposite wedge is oriented toward an upper opening of the slot, the transmission member working by compression during the gripping of the wedge.

3. The arrangement according to claim 2, wherein the transmission member slides along an arc of circle trajectory parallel to the bottom of the slot.

4. The arrangement according to claim 3, wherein the vertical translation force is produced by the movement of the screw toward the bottom of the slot, a first end of the transmission member being stressed bearing by the screw and a second end of the transmission member stressing the wedge by bearing.

5. The arrangement according to claim 1, further comprising two opposite second wedges that have opposite vertical gripping directions, the sliding of each second wedge being controlled respectively by the screw-nut assembly.

6. The arrangement according to claim 5, wherein the transmission member of one of the second wedges is a rigid part mounted for rotation around a longitudinal axis between the bottom of the slot and the lower edge of the panel, and wherein the transmission member of the other one of the second wedges is a flexible member that works by traction around a fixed angular member support that bypasses the lower edge of the panel.

7. An assembly for fastening a vertical panel in a longitudinal receiving slot by transverse gripping between at least two transversely opposite wedges, the assembly comprising:
    a panel having a first face and a second face;
    a longitudinal receiving slot having a bottom, a first vertical face, and a second vertical face;
    at least one first wedge inserted between the first vertical face of the slot and the first face of the panel;
    at least one opposite second wedge mounted across from the first wedge on the other side of the panel, the second wedge inserted between the second vertical face of the slot and the second face of the panel, the second wedge cooperating by vertical sliding with a fixed ramp to adjust the verticality of the panel;
    at least one screw-nut assembly configured to produce a vertical translational force from the second wedge in a gripping direction between the panel and the second vertical face of the slot;
    wherein the screw-nut assembly is arranged on the same side of the panel as the first wedge, the translational force being transmitted to the second wedge via a movable transmission member that is interposed between a lower edge of the panel and the bottom of the slot,
    wherein the movable transmission member is a rigid part mounted for rotation around a longitudinal axis between the bottom of the slot and the lower edge of the panel.

* * * * *